(12) United States Patent
Sugawara et al.

(10) Patent No.: US 8,223,742 B2
(45) Date of Patent: Jul. 17, 2012

(54) MULTICARRIER TRANSMITTING APPARATUS

(75) Inventors: Tomohiro Sugawara, Miyagi (JP); Yasuhiro Hasegawa, Miyagi (JP)

(73) Assignee: Panasonic Corporation, Osaka (JP)

( * ) Notice: Subject to any disclaimer, the term of this patent is extended or adjusted under 35 U.S.C. 154(b) by 577 days.

(21) Appl. No.: 12/377,369

(22) PCT Filed: Sep. 8, 2006

(86) PCT No.: PCT/JP2006/317838
§ 371 (c)(1),
(2), (4) Date: Feb. 12, 2009

(87) PCT Pub. No.: WO2008/029475
PCT Pub. Date: Mar. 13, 2008

(65) Prior Publication Data
US 2010/0220710 A1    Sep. 2, 2010

(51) Int. Cl.
*H04J 3/06* (2006.01)
(52) U.S. Cl. ......... 370/350; 370/476; 370/480; 370/503
(58) Field of Classification Search .......... 370/203–211, 370/310, 350, 464, 476, 480, 482, 503; 375/149, 375/293, 312
See application file for complete search history.

(56) References Cited

U.S. PATENT DOCUMENTS

| | | | |
|---|---|---|---|
| 6,597,729 B1 * | 7/2003 | Schmidl et al. | 375/149 |
| 7,782,750 B2 * | 8/2010 | Yamaura et al. | 370/206 |
| 7,894,417 B2 * | 2/2011 | Parts et al. | 370/350 |
| 2003/0152178 A1 | 8/2003 | Tanno | |
| 2004/0085946 A1 | 5/2004 | Morita | |
| 2007/0098053 A1 * | 5/2007 | Rinne et al. | 375/149 |
| 2007/0133390 A1 * | 6/2007 | Luo et al. | 370/208 |
| 2008/0132263 A1 * | 6/2008 | Yu et al. | 455/515 |

FOREIGN PATENT DOCUMENTS

| | | |
|---|---|---|
| JP | 2003-179522 | 6/2003 |
| JP | 2003-244763 | 8/2003 |

OTHER PUBLICATIONS

International Search Report dated Dec. 12, 2006.
Y. Hanada, et al., "Broadband MultiCarrier CDMA Denso ni Okeru Shuhasu Taju Doki Channel o Mochiita 3 Dankai Cell Search Tokusei," IEICE Technical Report, Jul. 12, 2001, vol. 101, No. 197, pp. 73-78.
3GPP TSG RAN WG1 Meeting #44, R1-060311, Denver, USA, Feb. 13-17, 2006, (Original R1-060042), Source: NTT DoCoMo, NEC, Sharp, Title:"SCH Structure and Cell Search Method for E-UTRA Downlink," Agenda Item: 13.1.3, Document for: Discussion and Decision, pp. 1-9.

* cited by examiner

*Primary Examiner* — Jeffrey M Rutkowski
(74) *Attorney, Agent, or Firm* — Dickinson Wright PLLC

(57) ABSTRACT

A multicarrier transmitting apparatus capable of providing a fast cell search. A base station apparatus (100), which serves as a multicarrier transmitting apparatus for transmitting frames each including, as synchronization channel sequences, first synchronization sequences (P-SCH sequence) used for timing determinations and second synchronization sequences (S-SCH sequence) different from the first synchronization sequences, comprises a frame forming part (130) that forms frames each including the first synchronization sequence (P-SCH sequence) disposed in each of subcarriers symmetrical with respect to a DC component subcarrier (DC subcarrier) in the frequency direction; and an RF transmitting part (160) that transmits the frames. In this way, a frame receiving end can use a filter having a polarly symmetrical pass-band and needs no frequency shifting process, with the result that the processing amount at the receiving end can be reduced and hence a fast cell search can be achieved.

11 Claims, 5 Drawing Sheets

MULTICARRIER TRANSMITTING APPARATUS

TECHNICAL FIELD

The present invention relates to a multicarrier transmitting apparatus. More particularly, the present invention relates to a multicarrier transmitting apparatus for transmitting a frame including synchronization channels used in establishing synchronization at the receiving side.

BACKGROUND ART

In the standards organization 3GPP, studies are conducted for 3GPP RAN LTE (Long Term Evolution) to realize further improvement of present third mobile phone systems.

Presently in LTE standardization meetings, a synchronization channel (SCH) transmission method for detecting synchronization of an OFDM (Orthogonal Frequency Division Multiplexing) signal is discussed, and various methods are proposed for multiplexing a primary SCH (P-SCH) and a secondary SCH (S-SCH).

Non-Patent document 1 discloses one of P-SCH and S-SCH multiplexing method examples. The document discloses a P-SCH and S-SCH frequency division multiplexing method, in which P-SCHs are multiplexed subcarriers having lower frequencies and S-SCHs are multiplexed on subcarriers having higher frequencies, with respect to a DC subcarrier (see FIG. 1). To perform timing synchronization processing using a replica-based correlation method at the receiving side of the frame formed in this multiplexing method, only the P-SCH is extracted by a bandpass filter (BPF) and subjected to correlation calculation with a P-SCH replica, and symbol timing, subframe timing, and so on are detected from the timing a peak occurs.

Non-patent Document 1: NTT DoCoMo, et al, "SCH Structure and Cell Search Method for E-UTRA Downlink," 3GPP TSG RAN WG1 Meeting *44 R1-060311

DISCLOSURE OF INVENTION

Problems To Be Solved By the Invention

As described above, to perform timing synchronization processing using a replica-based correlation method, it is necessary to extract the P-SCH, and, in the cases of P-SCH and S-SCH multiplexing methods (see FIG. 1) such as conventional techniques, the following two P-SCH extracting methods are possible.

The first method is to make a received signal pass a BPF having an asymmetrical passband as shown in FIG. 2. The second method is to make a received signal pass a lowpass filter (LPF) after frequency shift, as shown in FIG. 3.

However, in the above-described first method, a filter coefficient of a BPF become complex numbers, and so the amount of filter processing is twice as much as filter processing using real numbers, and therefore the amount of processing at the receiving side increases. Further, in the above-described second method, filter processing is performed after the P-SCH is placed in the center, so that the filter coefficient becomes real numbers. Nevertheless, frequency shift processing is required, and, multiplication processing for the frequency shift is required, and therefore the amount of processing at the receiving side increases. That is, any methods make the amount of processing increase at the receiving side, and therefore the time for cell search takes longer.

It is therefore an object of the present invention to provide a multicarrier transmitting apparatus realizing high speed cell search.

Means for Solving the Problem

The multicarrier transmitting apparatus of the present invention provides transmitting a frame in which a first synchronized sequence used in detecting a timing and a second synchronized sequence different from the first synchronized sequence as a synchronization channel sequence and adopts a configuration including: a frame forming section that forms a frame in which a first synchronized sequence is allocated to a subcarrier symmetrically with respect to a subcarrier of a direct-current component in the frequency domain; and a transmitting section that transmits the frame.

Advantageous Effect of the Invention

According to the present invention, it is possible to provide a multicarrier transmitting apparatus realizing high speed cell search.

BEST MODE FOR CARRYING OUT THE INVENTION

Now, an embodiment of the present invention will be described in detail with reference to the accompanying drawings.

Figure 1:
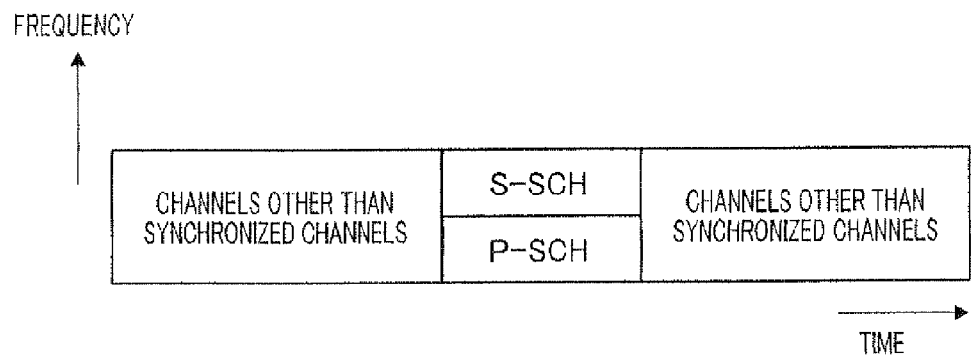
FIG. 1 explains a conventional synchronization channel allocation method.
Figure 2:
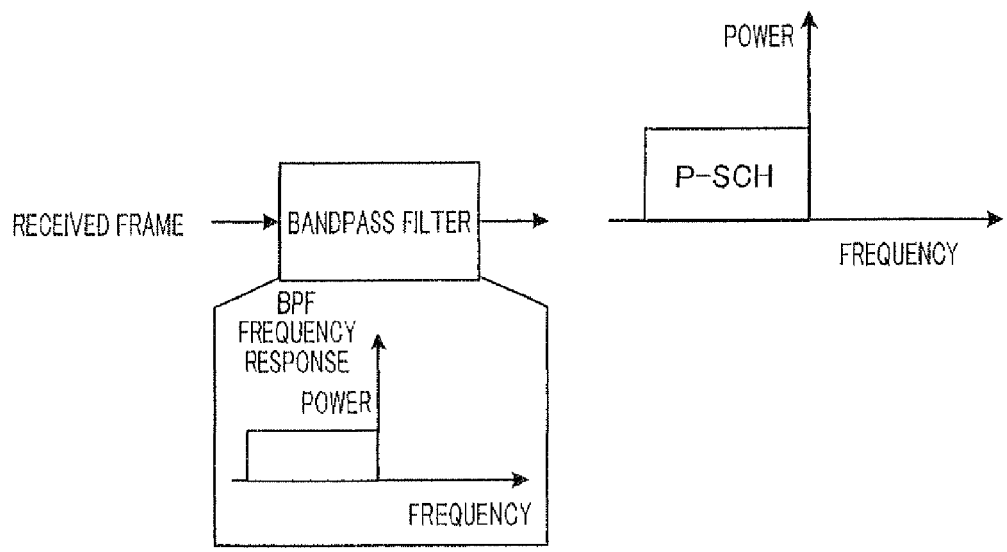
FIG. 2 explains one possible example of a method of filtering at the receiving side a frame in which synchronization channels are allocated using the method in FIG. 1.
Figure 3:
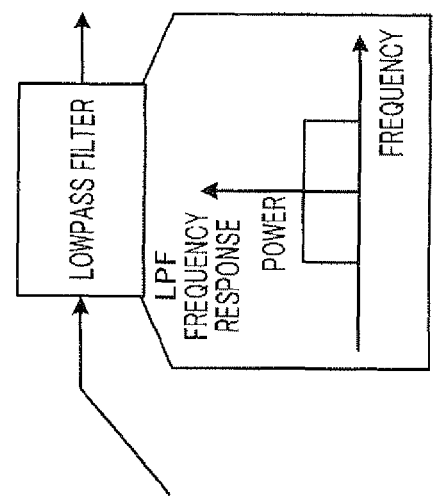
FIG. 3 explains another possible example of a method of filtering at the receiving side a frame in which synchronization channels are allocated using the method in FIG. 1.
Figure 3:
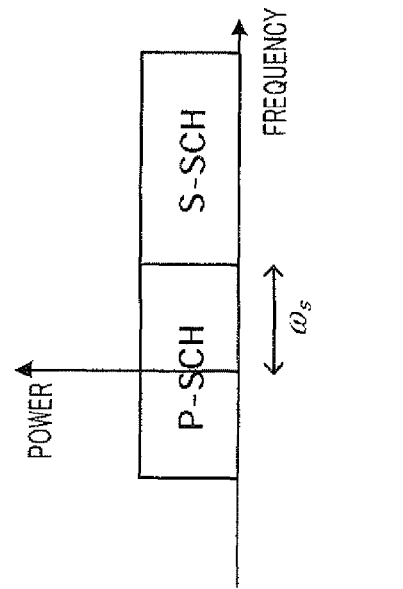
Figure 3:
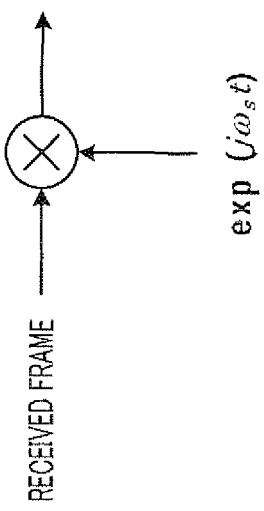
Figure 4:
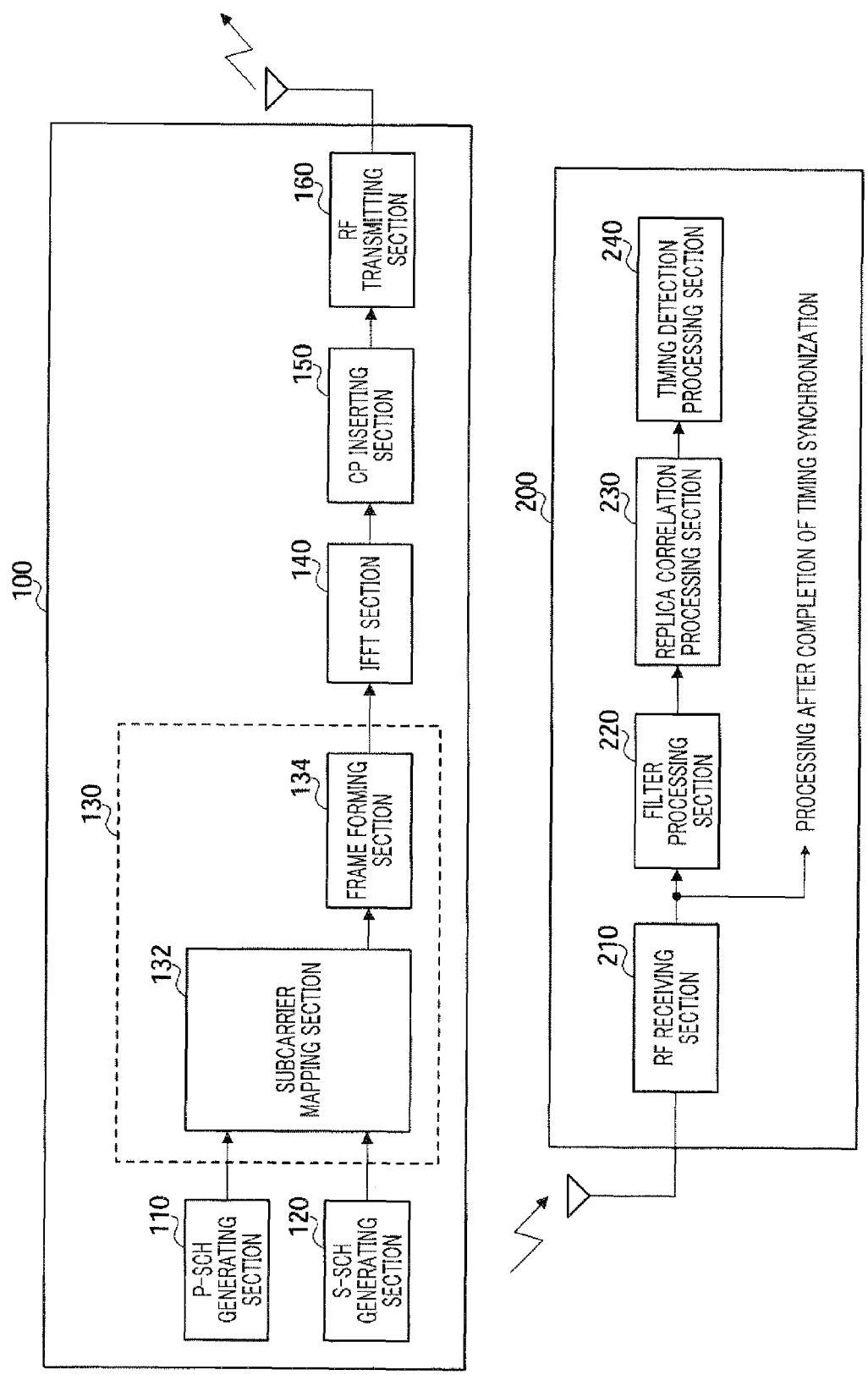
FIG. 4 is a block diagram showing the configuration of the multicarrier communication system according to the Embodiment of the present invention.

Referring to FIG. 4, the multicarrier communication system of the present embodiment has base station apparatus 100 as a multicarrier transmitting apparatus and mobile terminal apparatus 200 as a multicarrier receiving apparatus.

Base station apparatus 100 has P-SCH generating section 110, S-SCH generating section 120, frame forming section 130, inverse fast Fourier transform (IFFT) section 140, CP (Cyclic Prefix) inserting section 150 and RF transmitting section 160.

P-SCH generating section 110 generates a P-SCH sequence used to detect timing such as symbol timing and frame timing at the receiving side.

S-SCH generating section 120 generates a S-SCH sequence used to specify the scrambling code group in which the base station scrambling code of the base station apparatus is included (i.e. base-station specific code) at the receiving side.

Frame forming section 130 inputs the P-SCH sequences from P-SCH generating section 110, the S-SCH sequences from S-SCH generating section 120 and transmission data (not shown) such as data channels transmitted in the channels other than synchronized sequences, to form a frame using the input signals. Frame forming section 130 forms a frame having the configuration shown in the left of FIG. 5. That is, frame forming section 130 forms a frame by allocating the P-SCH sequences symmetrically with respect to the DC subcarrier (i.e. direct-current components) in the frequency domain, and by allocating the S-SCH sequences to both outer sides of the P-SCH sequences in the frequency domain, To be more specific, frame forming section 130 has subcarrier mapping section 132 and frame configuring section 134.

Subcarrier mapping section 132 inputs the P-SCH sequences from P-SCH generating section 110 and the S-SCH sequences from S-SCH generating section 120 and maps the P-SCH sequences to the subcarriers, which are symmetrically with respect to the DC subcarrier in the frequency domain and which are continuous in the frequency domain, among the subcarriers prepared in the base station apparatus. Further, subcarrier mapping section 132 maps the S-SCH sequences to the subcarriers to both outer sides of the subcarriers where the P-SCH sequences are allocated in the frequency domain.

Frame configuring section 134 forms a frame by allocating other channels including transmission data to symbols other than the symbols where the P-SCHs and the S-SCHs are allocated, to form a frame, and outputs the frame to IFFT section 140.

Inverse fast Fourier transform (IFFT) section 140 performs an IFFT on the frame formed in frame forming section 130, to form an OFDM signal, and outputs the OFDM signal to CP inserting section 150.

CP inserting section 150 inserts a CP (cyclic prefix) in the OFDM signal from IFFT section 140, and outputs the OFDM signal to RF transmitting section 160.

RF transmitting section 160 performs radio transmitting processing (e.g. digital-to-analog conversion processing and up-conversion processing to radio frequency bands) on the OFDM signal where a CP is inserted in CP inserting section 160, and transmits the OFDM signal via the antenna.

Further, mobile terminal apparatus 200 has RF receiving section 210, filter processing section 220, replica correlation processing section 230, and timing detection processing section 240.

RF receiving section 210 performs radio receiving processing (e.g. down-conversion processing to a baseband bandwidth and analog-to-digital conversion) on a received signal received via the antenna, and outputs the received signal after radio receiving processing to filter processing section 220.

Filter processing section 220 receives as input the signal after radio receiving processing from RF receiving section 210, extracts only the signal of the passband, and outputs the extracted signal to replica correlation processing section 230. In the present embodiment, as described above, the frame where the P-SCH sequences are allocated symmetrically with respect to the DC subcarrier (i.e. direct-current components) in the frequency domain and the S-SCH sequences are allocated to both outer sides of the P-SCH sequences in the frequency domain, is received, so that filter processing section 220 is set up such that only the bandwidth where the P-SCH sequences are allocated passes.

Replica correlation processing section 230 performs correlation calculation between the signal from filter processing section 220 and a P-SCH sequence replica, and outputs the correlation result to timing detection processing section 240.

Timing detection processing section 240 detects a peak in the correlation result from replica correlation processing section 230, and detects symbol timing, subframe timing and so on, from the timing the peak occurs. Based on the timing detected in timing detection processing section 240, in the succeeding processing sections, the S-SCH sequence included in the signal after radio receiving processing is extracted, and, from the S-SCH sequence, the code group is identified and the scrambling code is further identified. As such, a series of cell search processing is completed.

Next, the operations of the multicarrier communication system having the above configuration will be explained with reference to FIG. 5.

Figure 5:
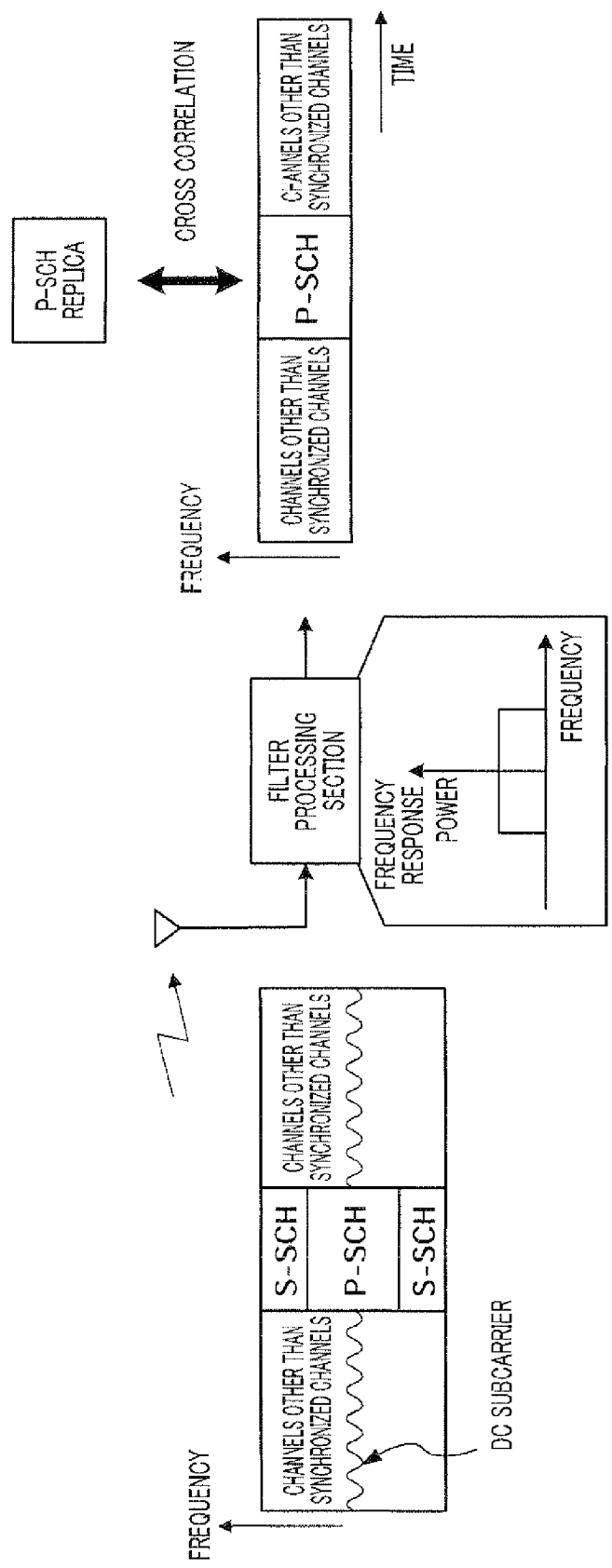
FIG. 5 is a frame configuration of the multicarrier communication system in FIG. 4 and explains the operations of the multicarrier communication system.

As shown in the left of FIG. 5, frame forming section 130 of base station apparatus 100 forms a frame where the P-SCH sequences are allocated symmetrically with respect to the DC subcarrier (i.e. direct-current components) in the frequency domain and the S-SCH sequences are allocated to both outer sides of the P-SCH sequences in the frequency domain. This frame is subjected to predetermined processing in IFFT section 140, CP inserting section 150 and RF transmitting section 160 and transmitted via the antenna.

In mobile terminal apparatus 200 of the receiving side, the signal transmitted from base station apparatus 100 is received via the antenna, subjected to predetermined processing in RF receiving section 210 and then inputted in filter processing section 220.

In filter processing section 220, only the signal of frequency band in which a zero frequency is placed in the center and the P-SCH sequences are allocated in base station apparatus 100 of the transmitting side passes. At this time, the frame where the P-SCH sequences are allocated symmetrically with respect to the DC subcarrier (i.e. direct-current components) in the frequency domain is transmitted from base station apparatus 100 of the transmitting side, so that, in mobile terminal apparatus 200 of the receiving side, filter processing section 220 having a symmetrical passband (see the center of FIG. 5) can be used. That is, the filter coefficient becomes only real numbers. Further, conventional frequency shift processing is not required. Consequently, by transmitting from base station apparatus 100 the frame where the P-SCH sequences are allocated symmetrically with respect to the DC subcarrier (i.e. direct-current components) in the frequency domain, the amount of processing at the receiving side is reduced, and cell search can be made high speed.

In replica correlation processing section 230, correlation calculation is carried out between the signal passing filter processing section 220 and a P-SCH sequence replica (see the right of FIG. 5).

Figure 6:
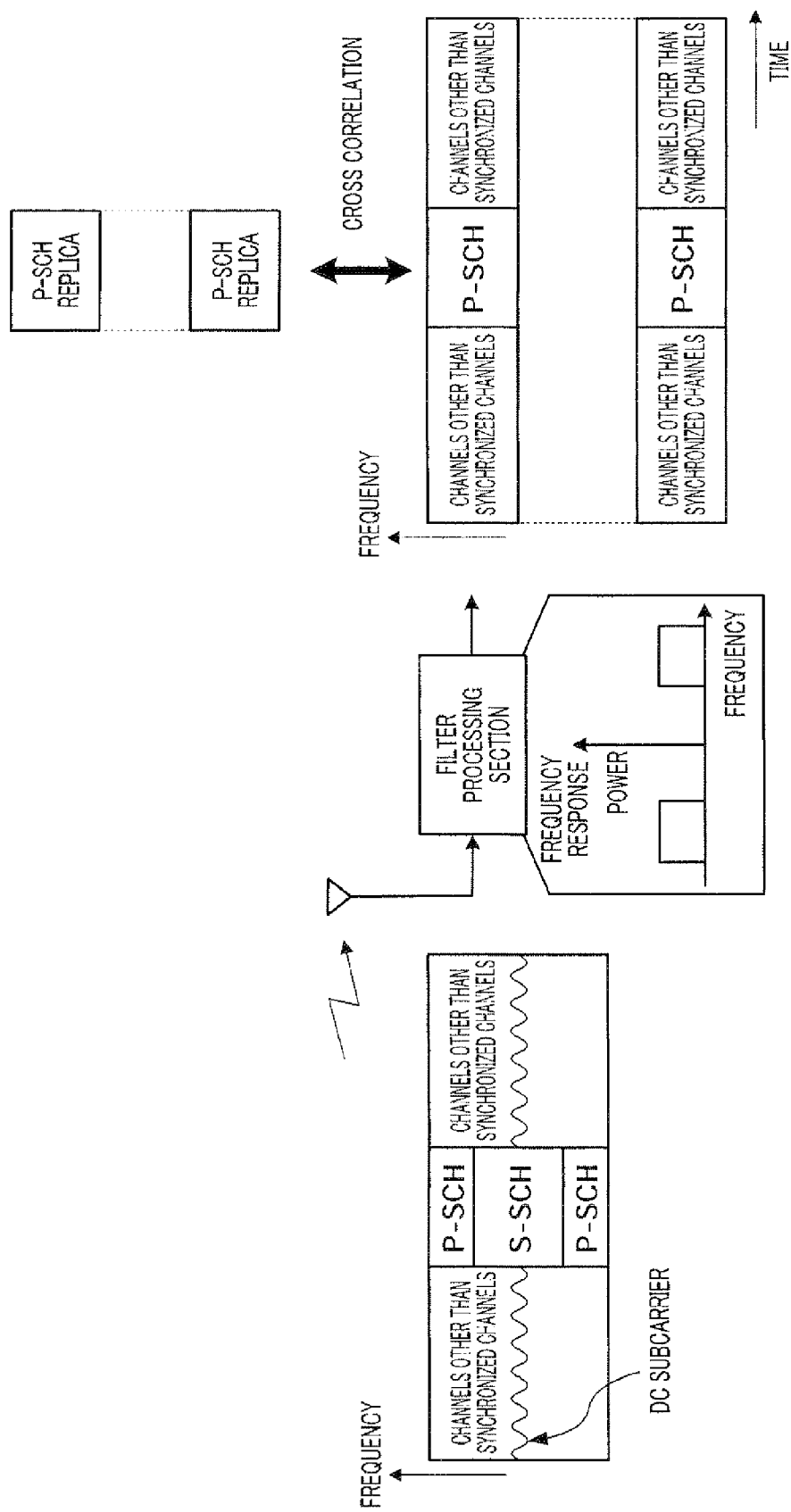
FIG. 6 is another frame configuration of the multicarrier communication system in FIG. 4 and explains the operations of the multicarrier communication system.

A case has been explained with the above description where base station apparatus 100 of the transmitting side transmits the frame in which the P-SCH sequences are allocated to the subcarriers symmetrically with respect to the DC subcarrier (i.e. direct-current components) in the frequency domain and continuous in the frequency domain, among the subcarriers prepared in the base station apparatus. However, the present invention is not limited to this, and, as shown in the left of FIG. 6, the subcarriers where the P-SCHs are allocated are placed symmetrically with respect to the DC subcarrier (i.e. direct-current components) in the frequency domain and may be made spaced apart frequency-wise with respect to the DC subcarrier. That is, the frame where the P-SCH sequences are allocated symmetrically with respect to the DC subcarrier (i.e. direct-current components) in the frequency domain may be transmitted from base station apparatus 100 of the transmitting side.

Incidentally, when the subcarriers where the P-SCH sequences are allocated are placed symmetrically with respect to the DC subcarrier (i.e. direct-current components) in the frequency domain and made spaced apart frequency-wise with respect to the DC subcarrier, as shown in the center of FIG. 6, filter processing section 220 has a non-passband in which a zero frequency is placed in the center and has passband to both sides of the non-passband. Then, correlation calculation is carried out between the signal of the bandwidth passing through filter processing section 220 and the P-SCH sequence replica (see the right of FIG. 6).

In this way, according to the present embodiment, base station apparatus 100 as a multicarrier transmitting apparatus for transmitting a frame in which first synchronized sequences (i.e. P-SCH sequences) used in detecting timings and second synchronized sequences (i.e. S-SCH sequences) different from the first synchronized sequences as synchronization channel sequences, has: frame forming section 130 forming a frame in which the first synchronized sequences (i.e. P-SCH sequences) are allocated to the subcarriers symmetrically with respect to the subcarrier of direct-current components (i.e. DC subcarrier) in the frequency domain, and RF transmitting section 160 transmitting the frame.

By this means, the amount of processing can be reduced at the frame receiving side, and cell search is performed at high speed as described above.

INDUSTRIAL APPLICABILITY

The multicarrier transmitting apparatus of the present invention is suitable for use in realizing high speed cell search at the receiving side.

The invention claimed is:

1. A multicarrier transmitting apparatus for generating a frame in which a first synchronization sequence used in detecting a timing and a second synchronization sequence different from the first synchronization sequence are allocated, the multicarrier transmitting apparatus comprising:
    a frame forming section that forms the frame such that the first synchronization sequence is allocated to a plurality of subcarriers symmetrically with respect to a center of bandwidth and the second synchronization sequence is allocated to a plurality of subcarriers symmetrically with respect to the center of bandwidth and symmetrically with respect to the first synchronization sequence; and
    a transmitting section that transmits a signal including the frame after the frame is subjected to predetermined processing.

2. The multicarrier transmitting apparatus according to claim 1, wherein the frame forming section forms the frame such that the first synchronization sequence is allocated to subcarriers that are continuous in a frequency domain and the second synchronization sequence is allocated to subcarriers that are divided in the frequency domain.

3. The multicarrier transmitting apparatus according to claim 1, wherein the frame forming section forms the frame such that the first synchronization sequence is allocated to a part of subcarriers that are continuous in a frequency domain, among subcarriers prepared in the multicarrier transmitting apparatus.

4. The multicarrier transmitting apparatus according to claim 1, wherein the frame forming section forms the frame such that the second synchronization sequence is allocated to a part of subcarriers that are continuous in a frequency domain, among subcarriers prepared in the multicarrier transmitting apparatus.

5. The multicarrier transmitting apparatus according to claim 1, wherein the frame forming section forms the frame such that the second synchronization sequence is allocated to two subcarrier groups.

6. A multicarrier transmitting apparatus for generating a frame in which a first synchronization sequence used in detecting a timing and a second synchronization sequence different from the first synchronization sequence are allocated, the multicarrier transmitting apparatus comprising:
    a circuit comprising a frame forming section that forms the frame such that the first synchronization sequence is allocated to a plurality of subcarriers symmetrically with respect to a center of bandwidth and the second synchronization sequence is allocated to a plurality of subcarriers symmetrically with respect to the center of bandwidth and symmetrically with respect to the first synchronization sequence; and
    a transmitter comprising a transmitting section that transmits a signal including the frame after the frame is subjected to predetermined processing.

7. The multicarrier transmitting apparatus according to claim 6, wherein the frame forming section forms the frame such that the first synchronization sequence is allocated to subcarriers that are continuous in a frequency domain and the second synchronization sequence is allocated to subcarriers that are divided in the frequency domain.

8. The multicarrier transmitting apparatus according to claim 6, wherein the frame forming section forms the frame such that the first synchronization sequence is allocated to a part of subcarriers that are continuous in a frequency domain, among subcarriers prepared in the multicarrier transmitting apparatus.

9. The multicarrier transmitting apparatus according to claim 6, wherein the frame forming section forms the frame such that the second synchronization sequence is allocated to a part of subcarriers that are continuous in a frequency domain, among subcarriers prepared in the multicarrier transmitting apparatus.

10. The multicarrier transmitting apparatus according to claim 6, wherein the frame forming section forms the frame such that the second synchronization sequence is allocated to two subcarrier groups.

11. A multicarrier transmitting method comprising:
    forming a frame by allocating a first synchronization sequence to a plurality of subcarriers symmetrically with respect to a center of bandwidth and by allocating a second synchronization sequence to a plurality of subcarriers symmetrically to the center of bandwidth and symmetrically with respect to the first synchronization sequence; and
    transmitting a signal including the frame after the frame is subjected to predetermined processing.

* * * * *